Figure 1:
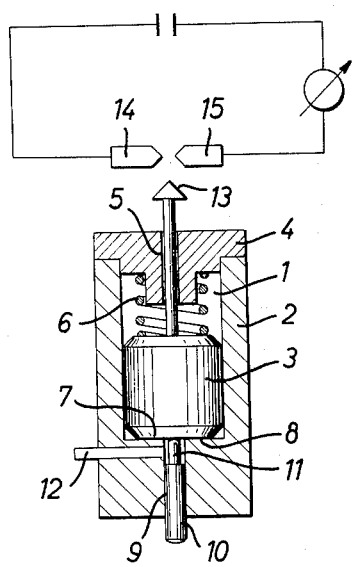

Aug. 24, 1965 W. KIRCHNER 3,202,176
DISPLACEMENT RELAY
Filed Aug. 11, 1960

Inventor
Willi Kirchner
By Stevens Davis Miller & Mosher
Attorneys

United States Patent Office 3,202,176
Patented Aug. 24, 1965

3,202,176
DISPLACEMENT RELAY
Willi Kirchner, Schweinfurt, Germany, assignor to Kugelfischer Georg Schafer & Co., Schweinfurt, Germany
Filed Aug. 11, 1960, Ser. No. 48,982
Claims priority, application Germany, Aug. 19, 1959,
K 38,484
1 Claim. (Cl. 137—464)

In the measurement of workpieces of all kinds, the so-called precision feeler gauges have commonly been used. These feeler gauges operate on mechanical, optical, electrical, electronic or pneumatic principles. Frequently it is necessary to sort the workpieces into groups of those of different sizes. If this sorting is to be carried out adequately, one must use feeler gauges which give optical, electric or pneumatic signals in accordance with the differences in measurements. The devices used for this purpose can conveniently be termed "relays."

In feeler gauges working on mechanical principles, electric contacts are usually used and they open and close in accordance with the position of a feeler pin which engages the workpiece. Such mechanically operated switching devices are referred to as displacement relays. In pneumatic gauges diaphragms or Bourdon tubes are built into the pneumatic circuit and operate electric contacts at a predetermined pressure. These devices can be referred to as pressure relays. In optical gauges one frequently uses photo-cells as switching elements whilst in electronic equipment thyratron valves are used. All these switching elements deliver signals of very small magnitude. In the switching elements designed for operating electric contacts, there is furthermore, for example, the disadvantage that the signal is given at very small contact pressures, so that the danger of sparking and the consequent unreliability of the switch is relatively large. Since all signals produced by such gauges must serve for the operation of adjusting devices such as levers, spindles, or hydraulic or penumatic cylinders, considerable and often expensive amplification is necessary; in many cases it is furthermore necessary to convert the signal into another physical form.

The disadvantages set out above in a displacement relay in which a signal is initiated by the movement of a feeler pin engaging the workpiece, the signal operating an automatic sorting device, are overcome according to the invention by a spring-loaded piston disposed in a cylinder, the movement of which is effected by an actuating peg and a very small movement from its rest position uncovers an admission opening for compressed air, the air which enters the cylinder being of such a pressure that the piston is moved further against the loading of the spring and this further movement of the piston provides the signal. In the displacement relay according to the invention, the travel of the actuating peg, which is naturally very small in the measurement of differences of dimensions of workpieces, and may be of the order of, for example $0.5\mu$, only has to be sufficient for the very small displacement of the piston of the relay from its rest position, whilst the actual operating movement of the piston is achieved by a pressure which is independent of the dimensional difference, being achieved by the compressed air entering the cylinder.

According to a further feature of the invention, the compressed air can be in a bore in that end face of the cylinder through which the actuating peg enters the cylinder, and the entry port, which is small in relation to the area of the face of the piston, is sealed off in the rest position of the piston by the face of the piston itself, and the air pressure is such that movement of the piston only takes place when the whole of the face of the piston is exposed to it. According to this further feature of the invention, the compressed air is permanently available at its entry port, but only acts on such a small part of the face of the piston that it cannot move the piston itself. On the arrival of a pressure pulse through the actuating peg, the compressed air can enter the cylinder since the piston no longer seals off the entry port, and the air now acts on the whole of the face of the piston opposite the entry port, so that the force acting on the piston face on arrival of the actuating pulse is suddenly increased and the further movement of the piston takes place.

According to a further preferred feature of the invention, the actuating peg has a smaller diameter in that portion which is adjacent to the end face of the cylinder than the bore in which it is guided, and the compressed air is fed into the annular space between this reduced portion of the operating peg and the wall of the bore. The piston can be formed according to the invention in a particularly simple manner as a ball. For the further transmission of the signal given by the displacement relay according to the invention, there can be arranged in the cylinder housing one or more air escape passages connected to pneumatic sorting devices in such a manner that they are uncovered by the movement of the piston effected by the compressed air. Alternatively, the piston can close electric contacts in a circuit by the effect of its movement caused by the compressed air, the sorting devices being included in the circuit.

Figure 3:
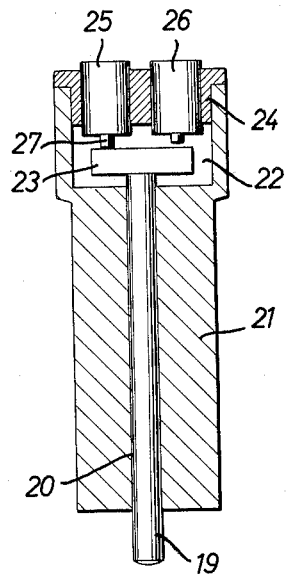
Figure 2:
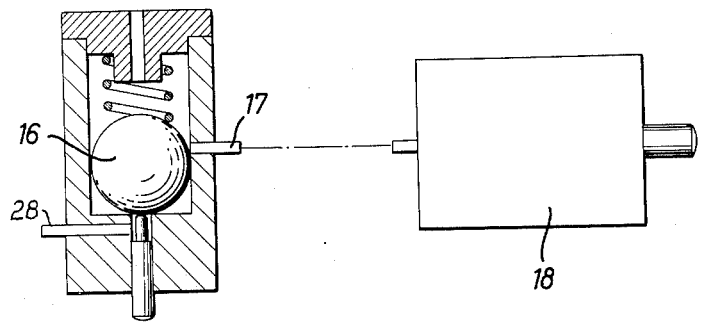

The invention is further explained in the following description in conjunction with the drawings which show different embodiments of the displacement relay according to the invention. In the drawings, FIGURE 1 shows an axial section through an embodiment of the displacement relay, whilst in FIGURE 2 is shown an axial section through a second form and a diagrammatic indication of a device to be actuated according to the invention. Finally, FIGURE 3 shows an arrangement in which two displacement relays according to the invention are connected to a feeler engaging the workpiece to be measured.

Referring to FIGURE 1, a cylinder 1 formed in a housing 2 carries within it a piston 3. The upper end of the cylinder 1 is closed by a cover 4 provided with an air-escape passage 5. A helical coil spring 6 disposed between the piston 3 and the cover 4 urges the piston 3 with its face 7 against the end face 8 of the cylinder bore. The cylinder end face 8 is interrupted by a bore 9 which is sealed off by the spring-loaded piston 3. An actuating peg 10 is axially slidable in the bore 9 and its upper end 11 has a smaller diameter than the bore 9. The cylinder housing 2 furthermore has a radial passage 12 which communicates with the annular space in the bore 9 formed around the reduced upper end 11 of the actuating peg 10. By means of the passage 12, compressed air can reach the above-mentioned annular space and act on the end face 7 of the piston.

The piston 3 is returned to its initial downward position after actuation by well known means. For example, in the inlet conduit of FIGURE 1, a three-way valve may be disposed. By operating this valve air enters the displacement relay which is then ready for switching. By operation of the relay, the three-way valve is brought into its rest position by well-known means. Thus the inlet conduit is vented and the piston returns to its seat. This well-known means does not per se form any part of the invention.

In its rest position the piston 3 remains in its lowermost position as a result of the loading by the helical coil spring 6 and it thereby seals off the entry port formed by the bore 9. The force produced by the compressed air present in this bore 9 is not sufficient to urge the piston 3 away from this position in which it seals off the bore. If, however, the piston 3 is displaced from its rest position in an upward direction by a very small amount, (e.g. 0.5μ) by the actuating peg 10 engaging directly or indirectly with the workpiece to be measured, the compressed air present in the bore 9 can enter the cylinder 1 and it now acts over the whole face of the piston 7 and moves the piston 3 with considerable force until it strikes the cover 4 and operates the electric contact 13 shown in the embodiment of FIGURE 1, and thereby closes the circuit indicated at 14 and 15, in which circuit is contained the sorting device. As a large force acts on the piston 3 there is a high contact pressure and accordingly large electric currents can be controlled.

The modified form of displacement relay according to the invention shown in FIGURE 2 is substantially the same in construction and operation as that shown in FIGURE 1. The piston 16 is, however, formed in a particularly simple manner as a ball which in its rest position seals off the entry port for the compressed air. The cylinder housing of the displacement relay is provided in this case with an air escape passage 17 which is so arranged that the compressed air can pass to an air cylinder 18 associated with the sorting device, when it has moved the piston 16 upwards against the cover of the cylinder housing. Reference numeral 28 indicates a passageway supplying compressed air.

If several signals are required, as is commonly the case in the measurement of sorting of workpieces, then several displacement relays can co-operate with the feeler pin of a suitable gauge. Such an arrangement is shown in FIGURE 3. Here the feeler pin 19 of a gauge is mounted to be axially slidable in a bore 20 in a housing 21. The upper portion of the housing 21 has a hollow space 22 which receives the broadened end 23 of the pin 19. Bores in a cover 24 for the housing carry two displacement relays 25 and 26 of which the relay 25 has a longer actuating peg 27 than the relay 26, so that the relay 25 is operated earlier in a given upward movement of the feeler pin 19 than the relay 26.

I claim:

Relay device of the character described comprising a cylinder, a ball type piston disposed in the cylinder, said cylinder having opposing inner ends, a spring located between one of the ends of the cylinder and the adjoining end of the piston for biasing the piston to a rest position against the other inner end of the cylinder, said piston having its peripheral portion in sealing engagement with the inner surface of said cylinder to substantially seal off communication between said opposing inner ends of said cylinder and the opposite sides of said piston, a bore in the other end of the cylinder, and actuating peg slidably disposed in said bore and bearing against the piston to move the piston a slight distance from its rest position, said peg having a smaller diameter at the inner end of the bore to define an annular space between the peg and the bore constituting an entry port for compressed air, which port is uncovered by the slight movement of the piston so that the compressed air, which is constantly present in the port, enters the cylinder to act against the entire face of the piston and displace the piston further in the cylinder against the force of the spring, means supplying compressed air to said space, said entry port being small relative to the end face of the piston in the rest position of the piston and the air pressure being of such a value that it only causes movement of the piston when it acts on the entire end face of the piston, said cylinder having at least one air escape passage which is uncovered by such further movement of the piston in the cylinder.

References Cited by the Examiner

UNITED STATES PATENTS

| | | |
|---|---|---|
| 60,082 | 11/66 | Streett et al. |
| 940,349 | 11/09 | McKeen _____ 137—625.26 |
| 1,099,719 | 6/14 | Ovenden _____ 137—246.23 |
| 2,107,673 | 2/38 | Lovekin. |
| 2,471,579 | 5/49 | Neuroth _____ 137—792 |
| 2,638,108 | 5/53 | Williams et al. ___ 137—625.26 X |
| 2,667,631 | 1/54 | Schaurte _____ 200—61.4 |
| 2,672,892 | 3/54 | Harris _____ 137—792 |
| 2,887,125 | 5/59 | Lucien _____ 137—625.27 X |
| 2,970,612 | 2/61 | Lornitzo _____ 137—620 |
| 2,986,120 | 5/61 | Murek _____ 121—38 |
| 2,997,025 | 8/61 | Ottestad et al. _____ 121—38 |
| 3,007,492 | 11/61 | Grimmer _____ 137—620 |

FOREIGN PATENTS 561,698   5/44   Great Britain.

M. CARY NELSON, *Primary Examiner.*

MAX L. LEVY, KARL J. ALBRECHT, *Examiners.*